United States Patent
Xiao et al.

(10) Patent No.: US 11,963,257 B2
(45) Date of Patent: Apr. 16, 2024

(54) USER EQUIPMENT THAT CONFIGURES PDCP DUPLICATION, AND PDCP DUPLICATION CONFIGURATION METHOD THEREOF, AND BASE STATION THAT CONFIGURES PDCP DUPLICATION, AND PDCP DUPLICATION CONFIGURATION METHOD THEREOF

(71) Applicant: SHARP KABUSHIKI KAISHA, Sakai (JP)

(72) Inventors: Fangying Xiao, Shanghai (CN); Renmao Liu, Shanghai (CN)

(73) Assignee: SHARP KABUSHIKI KAISHA, Osaka (JP)

( * ) Notice: Subject to any disclaimer, the term of this patent is extended or adjusted under 35 U.S.C. 154(b) by 400 days.

(21) Appl. No.: 17/312,694

(22) PCT Filed: Dec. 9, 2019

(86) PCT No.: PCT/CN2019/124034
§ 371 (c)(1),
(2) Date: Jun. 10, 2021

(87) PCT Pub. No.: WO2020/119640
PCT Pub. Date: Jun. 18, 2020

(65) Prior Publication Data
US 2022/0070969 A1 Mar. 3, 2022

(30) Foreign Application Priority Data
Dec. 11, 2018 (CN) .......................... 201811515628.X

(51) Int. Cl.
*H04W 76/34* (2018.01)

(52) U.S. Cl.
CPC .................................. *H04W 76/34* (2018.02)

(58) Field of Classification Search
CPC .......... H04W 76/34; H04W 76/15; H04L 1/08
See application file for complete search history.

(56) References Cited

U.S. PATENT DOCUMENTS

| 11,503,502 B2* | 11/2022 | Baek ..................... H04W 28/06 |
| 2018/0199315 A1* | 7/2018 | Hong ..................... H04L 47/34 |

(Continued)

FOREIGN PATENT DOCUMENTS

| CN | 108811175 A | 11/2018 |
| CN | 108924948 A | 11/2018 |

(Continued)

OTHER PUBLICATIONS

Nokia et al., "Revised SID: Study on NR Industrial Internet of Things (IoT)", RP-182090, 3GPP TSG RAN meeting #81 Gold Coast, Australia, Sep. 10-13, 2018.

(Continued)

*Primary Examiner* — Jael M Ulysse
(74) *Attorney, Agent, or Firm* — ScienBiziP, P.C.

(57) ABSTRACT

Provided in the present invention are user equipment and a method thereof, and a base station and a method thereof. The method in user equipment comprises: receiving a switching MAC CE from a base station; and activating and/or deactivating an RLC entity and/or a logical channel associated with a bearer that supports the PDCP duplication based on the switching MAC CE.

4 Claims, 3 Drawing Sheets

(56) References Cited

U.S. PATENT DOCUMENTS

| | | | |
|---|---|---|---|
| 2018/0279168 A1* | 9/2018 | Jheng | H04L 5/001 |
| 2018/0309660 A1* | 10/2018 | Loehr | H04L 45/14 |
| 2018/0310202 A1* | 10/2018 | Löhr | H04W 76/27 |
| 2018/0324641 A1* | 11/2018 | Tsai | H04W 72/04 |
| 2018/0324642 A1* | 11/2018 | Yu | H04L 5/0053 |
| 2018/0368132 A1* | 12/2018 | Babaei | H04W 76/11 |
| 2018/0368200 A1* | 12/2018 | Jin | H04L 1/189 |
| 2019/0053325 A1* | 2/2019 | Yu | H04W 76/15 |
| 2019/0058550 A1* | 2/2019 | Kim | H04L 1/1825 |
| 2019/0098533 A1* | 3/2019 | Babaei | H04L 1/08 |
| 2019/0253924 A1* | 8/2019 | Kim | H04W 28/0273 |
| 2019/0253926 A1* | 8/2019 | Kim | H04L 1/08 |
| 2019/0254117 A1* | 8/2019 | Chen | H04L 47/34 |
| 2019/0357292 A1* | 11/2019 | Cirik | H04L 5/0053 |
| 2019/0387535 A1* | 12/2019 | Kim | H04W 72/23 |
| 2020/0029379 A1* | 1/2020 | Xiao | H04L 1/22 |
| 2020/0037151 A1* | 1/2020 | Du | H04W 8/30 |
| 2020/0053566 A1* | 2/2020 | Kim | H04W 36/0069 |
| 2020/0100235 A1* | 3/2020 | Jo | H04W 80/02 |
| 2021/0112610 A1 | 4/2021 | Xiao et al. | |
| 2021/0160733 A1* | 5/2021 | Kim | H04W 76/27 |
| 2021/0297899 A1* | 9/2021 | Baek | H04W 28/06 |
| 2022/0014961 A1* | 1/2022 | Baek | H04L 1/08 |
| 2022/0286382 A1* | 9/2022 | Loehr | H04L 45/24 |

FOREIGN PATENT DOCUMENTS

| | | |
|---|---|---|
| EP | 3399724 A1 | 11/2018 |
| WO | 2018/170891 A1 | 9/2018 |

OTHER PUBLICATIONS

"3rd Generation Partnership Project; Technical Specification Group Radio Access Network; NR; Radio Resource Control (RRC) protocol specification(Release 15)", 3GPP TS 38.331 V15.3.0 (Sep. 2018).

OPPO, "Discussion on data duplication for IIoT", R2-1817251, 3GPP TSG-RAN WG2 #104 Spokane, United States, Nov. 12-16, 2018.

LG Electronics Inc., "Consideration of the PDCP duplication", R2-1818360, 3GPP TSG-RAN WG2 Meeting #104 Spokane, USA, Nov. 12-16, 2018.

Qualcomm Incorporated, "Impact of PDCP duplication on LCP", R2-1801253, 3GPP TSG-RAN WG2 Meeting #NR adhoc1 2018 Vancouver, Canada, Jan. 22-26, 2018.

CMCC, "Mechanism of PDCP duplication with multiple RLC entities", R2-1905916, 3GPP TSG-RAN WG2 Meeting #106 Reno, Nevada, USA, May 13-17, 2019.

Ericsson,"RLC behavior after RLC failure in CA duplication", Tdoc R2-1811882, 3GPP TSG-RAN WG2#103, Gothenburg, Sweden, Aug. 20-24, 2018.

Ericsson,"PDCP duplication", Tdoc R2-1803159, 3GPP TSG-RAN WG2 #101, Athens, Greece, Feb. 26-Mar. 2, 2018.

Huawei et al., "General enhancements for PDCP Duplication", R2-1817512, 3GPP TSG-RAN WG2#104, Spokane, USA, Nov. 12-16, 2018.

Ericsson, "PDCP duplication and discard", R2-1711242 3GPP TSG-RAN WG2 #99bis, Prague, Czech Republic, Oct. 9-13, 2017.

ZTE, "Consideration on the activation/deactivation of data duplication for CA", R2-1704660 3GPP TSG-RAN WG2 Meeting #98, Hangzhou, China, May 15-19, 2017.

TSG RAN2, "LS on RAN2 agreements for LTE URLLC", R1-1803585(R2-1804084) 3GPP TSG RAN WG1 Meeting #92bis, Sanya, China, Apr. 16-20, 2018, XP051412852.

Ericsson, "PDCP duplication discard and recovery", R2-1802715 3GPP TSG RAN WG2 #101, Athens, Greece, Feb. 26-Mar. 2, 2018.

TSG RAN2, "LS on RAN2 agreements for LTE URLLC", R1-1803585(R2-1804084) 3GPP TSG RAN WG1 Meeting #92bis, Sanya, China, Apr. 16-20, 2018, XP051449017.

* cited by examiner

USER EQUIPMENT THAT CONFIGURES PDCP DUPLICATION, AND PDCP DUPLICATION CONFIGURATION METHOD THEREOF, AND BASE STATION THAT CONFIGURES PDCP DUPLICATION, AND PDCP DUPLICATION CONFIGURATION METHOD THEREOF

TECHNICAL FIELD

The present disclosure relates to the technical field of wireless communications. More specifically, the present disclosure relates to user equipment and a method thereof, and a base station and a method thereof.

BACKGROUND

In September 2018, Nokia proposed a study item on the 5G (or NR) industrial internet of things (IIoT) (see non-patent literature: RP-182090: Revised SID: Study on NR Industrial Internet of Things (IoT)) at the 3rd Generation Partnership Project (3GPP) RAN #81 plenary meeting, and the study item was approved. One of the goals of this study item is to improve the reliability of data transmission and reduce the time delay of data transmission by means of data duplication, specifically including: (1) resource-efficient PDCP duplication, such as avoiding unnecessary duplicate transmissions; and (2) more than two PDCP duplications implemented by dual connectivity or carrier aggregation.

In Release 15, a bearer that supports PDCP duplication can be configured with two RLC entities at most. The initial state of the bearer configured with PDCP duplication indicates whether the PDCP duplication function is initially activated by means of a pdcp-Duplication information element (see 3GPP TS38.331 for a detailed description of the information element). In carrier aggregation, for a bearer in which an initial PDCP duplication function is not activated, data of the bearer is transmitted by means of a logical channel indicated by a primaryPath information element (see 3GPP TS38.331 for a detailed description of the information element). In dual connectivity, for a bearer in which an initial PDCP duplication function is not activated, it is determined, according to the amount of data to be transmitted, whether the data is to be transmitted by means of a logical channel indicated by a primaryPath information element (see 3GPP TS38.331 for a detailed description of the information element) or by using a split bearer.

In NR IIoT, in order to achieve the goal of more than two PDCP duplications by means of dual connectivity or carrier aggregation, some manufacturers propose to configure a plurality of RLC entities for a bearer that supports PDCP duplication, but only activate a number of RLC entities thereamong each time. If a bearer that supports PDCP duplication can be configured with a plurality of (more than two) RLC entities, a problem to be resolved is how to dynamically switch RLC entities used to transmit PDCP PDU for the bearer configured with a plurality of RLC entities.

SUMMARY OF INVENTION

In order to resolve the above problem in the prior art, provided in the present invention are a method in user equipment, user equipment, a method in a base station, and a base station.

According to a first aspect of the present invention, provided is a method in user equipment, comprising: receiving, from a base station, a switching MAC CE; and activating and/or deactivating the RLC entities and/or logical channels associated with the bearer that supports the PDCP duplication based on the switching MAC CE.

In the above method, the switching MAC CE comprises: a first field for indicating the bearer that supports the PDCP duplication; and a second field for indicating the radio link control (RLC) entities or logical channels associated with the bearer or a PDCP entity of the bearer.

In the above method, if the first field is set to be Di, then Di corresponds to radio bearer i, where i is a corresponding serial number in ascending or descending order of radio bearer identities of radio bearers configured with the PDCP duplication, the radio bearers comprises data radio bearers (DRBs) and/or signaling radio bearers (SRBs). If the second field is set to be Lij, then Lij represents activating or deactivating the j-th RLC entity and/or logical channel of the bearer corresponding to the first field Di, where j is a serial number in ascending or descending order of logical channel identities of RLC entities and/or logical channels associated with the radio bearer corresponding to the first field Di. Whether the RLC entity and/or the logical channel corresponding to the second field Lij is activated or deactivated is determined according to the value of the second field Lij.

In the above method, if the SRB supports dynamic switching of RLC entities or logical channels for data transmission, the DRB and the SRB use the different switching MAC CEs.

In the above method, the switching MAC CE further comprises a third field, and if the SRB supports dynamic switching of RLC entities or logical channels for data transmission, the third field indicates whether the corresponding switching MAC CE is used for the SRB or the DRB.

In the above method, if the switching MAC CE is used to activate or deactivate the PDCP duplication, whether the radio bearer i corresponding to the first field Di is in an activated state or a deactivated state is determined according to the value of the first field Di.

In the above method, the RRC message comprises group information for indicating an RLC entity group or logical channel group or RLC bearer group that can be used after activation of the PDCP duplication.

According to a second aspect of the present invention, user equipment is provided, comprising: a processor; and a memory storing instructions, wherein the instructions, when run by the processor, execute the method in user equipment described herein.

According to a third aspect of the present invention, provided is a method in a base station, comprising: generating an RRC message comprising information for instructing user equipment (UE) to perform activation configuration of packet data convergence protocol (PDCP) duplication; transmitting the RRC message to the UE; and generating and transmitting a switching MAC CE to the UE, and instructing the UE by means of the switching MAC CE to activate and/or deactivate RLC entities and/or logical channels associated with a bearer that supports the PDCP duplication.

According to a fourth aspect of the present invention, a base station is provided, comprising: a processor; and a memory storing with instructions, wherein the instructions, when run by the processor, execute the method in a base station described herein.

BRIEF DESCRIPTION OF THE DRAWINGS

The above and other features of the present disclosure will become more apparent with the following detailed description in conjunction with the accompanying drawings.

DETAILED DESCRIPTION

Figure 1:
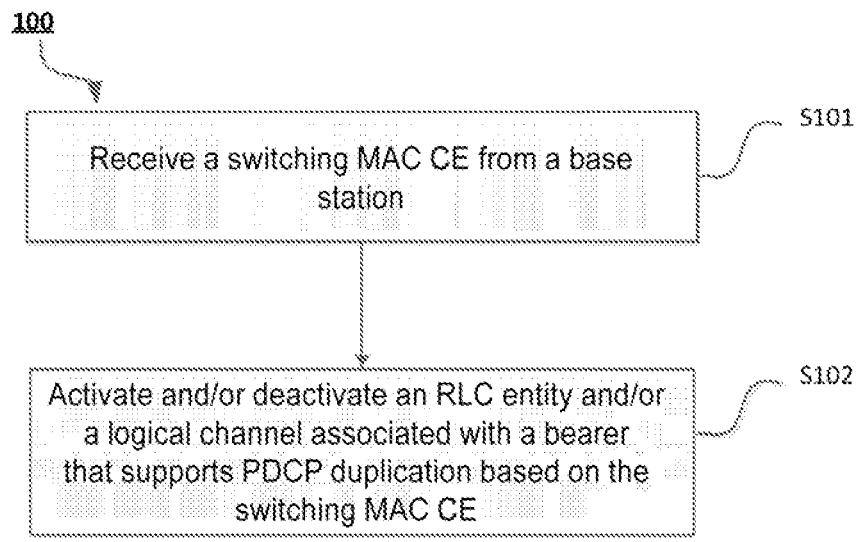
FIG. 1 shows a flowchart of a method 100 in user equipment (UE) based on an embodiment of the present disclosure.

The following describes the present disclosure in detail with reference to the accompanying drawings and specific embodiments. It should be noted that the present disclosure should not be limited to the specific embodiments described below. In addition, for simplicity, detailed description of the prior art not directly related to the present disclosure is omitted to prevent confusion in understanding the present disclosure.

Some terms involved in the present disclosure are described below. If not specifically indicated, the terms involved in the present disclosure use the definitions herein. The terms given in the present disclosure may be named differently in NR, LTE, and eLTE, but unified terms are used in the present disclosure. When applied to a specific system, the terms may be replaced with terms used in the corresponding system.

RRC: radio resource control.

PDCP: packet data convergence protocol.

RLC: radio link control. The transmission mode of an RLC entity can be configured as one of a transparent mode (TM), an unacknowledged mode (UM), or an acknowledged mode (AM).

MAC: medium access control.

MAC CE: MAC control element.

PDU: protocol data unit.

SDU: service data unit.

In the present disclosure, data received from or transmitted to an upper layer is referred to as an SDU, and data transmitted to or received from a lower layer is referred to as a PDU. For example, data received from or transmitted to an upper layer by a PDCP entity is referred to as a PDCP SDU; and data received from or transmitted to an RLC entity by the PDCP entity is referred to as a PDCP PDU (i.e., an RLC SDU).

PDCP-Config information element: the information element PDCP-Config is used to set configurable PDCP parameters for a signaling bearer and a data bearer.

RLC-BearerConfig information element: the information element RLC-BearerConfig is used to configure an RLC entity, a corresponding logical channel in MAC and the linking to a PDCP entity (served radio bearer).

Master base station: master eNB or master gNB, denoted as MeNB (a base station corresponding to E-UTRAN or LTE or eLTE) or MgNB (a base station corresponding to 5G-RAN or NR). The master base station is an eNB that at least terminates at a control node mobility management entity (which can be denoted as S1-MME) for processing interaction between UE and a core network in dual-connectivity; or a gNB that at least terminates at an NG-C, wherein the NG-C is a control plane interface between an NG-RAN and a 5GC.

Secondary base station: secondary eNB or secondary gNB, denoted as SeNB (a base station corresponding to E-UTRAN or LTE or eLTE) or SgNB (a base station corresponding to 5G-RAN or NR). In dual connectivity, the secondary base station is a base station that is not a primary base station but provides additional radio resources for UE.

Primary Cell: PCell. The PCell is a cell that operates at a primary frequency, and may be a cell on which UE performs an initial connection establishment procedure or initiates a connection re-establishment procedure or which is designated as a primary cell during a handover procedure. The cell in the present disclosure may also be referred to as a carrier or a set of beams.

Primary Secondary Cell: PSCell. The PSCell is an SCG cell used to instruct UE to perform random access during an SCG switching procedure.

Secondary Cell: SCell. The SCell is a cell that operates at a secondary frequency. The cell can be configured after an RRC connection is established and can be used to provide additional radio resources.

Cell group: CG. In dual-connectivity or multi-connectivity, the cell group is a group of serving cells or carriers associated with a primary base station or a secondary base station, which may be an MCG or an SCG.

Master cell group: MCG. For UE that is not configured with dual connectivity, the MCG consists of all serving cells; for UE that is configured with dual connectivity, the MCG consists of a subset of the serving cells (i.e., a group of serving cells associated with a primary base station), which includes a PCell and 0, 1 or a plurality of SCells.

Secondary cell group: SCG. The SCG is a group of serving cells associated with an SeNB or an SgNB in dual-connectivity. The SCG may comprise one PSCell, and may further comprise one or a plurality SCells.

Dual connectivity: DC.

DRB: data radio bearer carrying user plane data, or is briefly referred to as a data radio bearer.

SRB: signaling radio bearer.

Split SRB: split SRB.

Unless otherwise stated, the bearer or radio bearer described in the present disclosure may be: an SRB, a DRB, a split DRB (for example, an MCG split DRB or an SCG split DRB), or a split SRB (for example, an MCG split SRB or an SCG split SRB).

PDCP duplication: it may also be referred to as duplication, packet duplication or data duplication. An SRB, a DRB, a split SRB, and a split DRB may all be configured with the PDCP duplication. When a radio bearer is configured with the PDCP duplication, a secondary RLC entity and a secondary logical channel are added to the radio bearer to process duplicate PDCP PDUs. The PDCP duplication means that the same PDCP PDU is transmitted twice or many times, and the PDCP PDU transmitted twice or many times is transmitted by means of RLC entities and/or logical channels associated with different carriers or carrier groups. In a dual connectivity manner, the RLC entities and/or logical channels of radio bearers configured with the PDCP duplication belong to different MAC entities.

Duplication activation/deactivation MAC CE: duplication activation/deactivation MAC CE used to activate or deactivate PDCP duplication of a radio bearer.

Total data volume: the total amount of a PDCP data volume and a data volume of two or more associated RLC entities (or activated RLC entities) (RLC data volume pending for initial transmission) (the total amount of PDCP data volume and RLC data volume pending for initial transmission in the activated RLC entities).

Primary path: in carrier aggregation, when PDCP duplication is deactivated, a PDCP entity transmits PDCP PDUs to the primary path. In dual connectivity, when PDCP duplication is deactivated, if a total data volume is less than a data split threshold, the PDCP entity transmits PDCP PDUs to the primary path.

Secondary path: in carrier aggregation and dual connectivity, when PDCP duplication is activated, the secondary path is an RLC entity and/or a logical channel and/or an RLC bearer used to transmit PDCP PDUs. Specifically, when PDCP duplication is activated, a PDCP entity duplicates a PDCP PDU and transmit the PDCP PDUs to an activated RLC entity(ies) and/or logical channel(s) and/or RLC bearer(s) (also referred to as a primary path and a secondary path(s)). The embodiments in the present disclosure specifically describe those RLC entities and/or logical channels and/or RLC bearers that are considered to be activated. Among the activated RLC entities and/or logical channels and/or RLC bearers, RLC entities and/or logical channels and/or RLC bearers except for the primary path can all be referred to as secondary paths.

A method in user equipment (UE) in the present disclosure is described below. Specifically, a control method involved in PDCP duplication of a bearer in the UE is described. As an example, FIG. 1 shows a flowchart of a method 100 in user equipment (UE) based on an embodiment of the present disclosure.

In step S101, user equipment (UE) receives a switching MAC CE from a base station.

In step S102, the user equipment (UE) activates and/or deactivates the RLC entities and/or logical channels associated with the bearer that supports PDCP duplication based on the switching MAC CE. In other words, the user equipment (UE) switches to the RLC entity(ies) and/or the logical channel(s) for transmitting a PDCP PDU in the RLC entities and/or logical channels associated with the bearer that supports PDCP duplication based on the switching MAC CE.

The switching MAC CE may comprise: a first field for indicating the bearer that supports PDCP duplication; and a second field for indicating the RLC entities or logical channels associated with the bearer or a PDCP entity of the bearer.

In the switching MAC CE, if the first field is set to Di, then Di corresponds to radio bearer i, where i is a corresponding serial number in ascending or descending order of radio bearer identities of radio bearers configured with the PDCP duplication, and the radio bearers comprise data radio bearers (DRBs) and/or signaling radio bearers (SRBs).

In the switching MAC CE, if the second field is set to Lij, then Lij indicates activating or deactivating the j-th RLC entity and/or logical channel of the radio bearer corresponding to the first field Di, where j is a serial number in ascending or descending order of logical channel identities of RLC entities and/or logical channels associated with the radio bearer corresponding to the first field Di.

In the method of user equipment (UE), whether the RLC entity and/or the logical channel corresponding to the second field Lij is activated or deactivated may be determined according to the value of the second field Lij.

Regarding to the "switching MAC CE" defined in the above content, appropriate settings may be made with reference to the content of the following embodiments.

Figure 2:
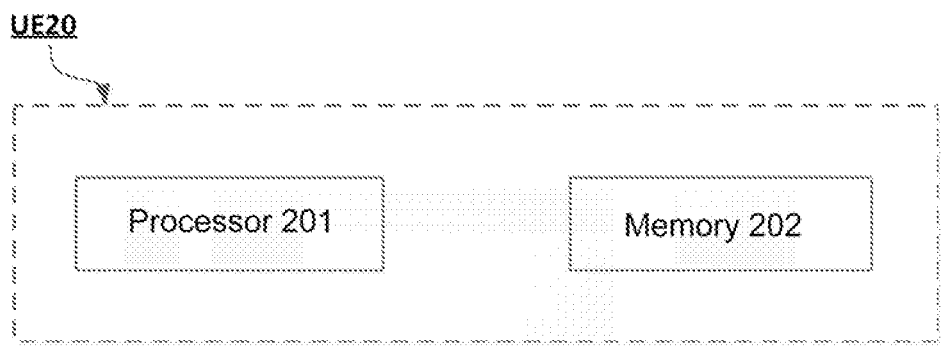
FIG. 2 shows a block diagram of user equipment 20 based on an embodiment of the present disclosure.

In addition, FIG. 2 shows a block diagram of user equipment 20 according to an embodiment of the present disclosure. As shown in FIG. 2, the user equipment 20 includes a processor 201 and a memory 202. The processor 201 may include, for example, a microprocessor, a microcontroller, an embedded processor, and the like. The memory 202 may include, for example, a volatile memory (for example, a random access memory (RAM)), a hard disk drive (HDD), a non-volatile memory (for example, a flash memory), or other memory systems. The memory 202 stores program instructions. The instructions, when run by the processor 201, can execute the method in user equipment described in detail in the present disclosure.

Figure 3:
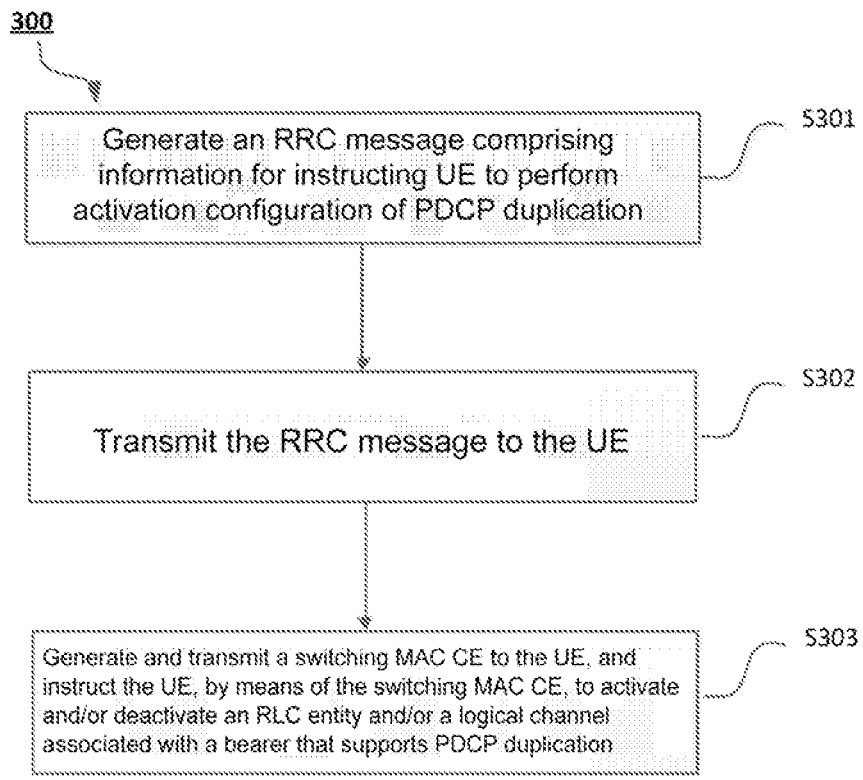
FIG. 3 shows a flowchart of a method 300 in a base station based on an embodiment of the present disclosure.

Furthermore, as an example, FIG. 3 shows a flowchart of a method 300 in a base station based on an embodiment of the present disclosure.

In step S301, a base station generates an RRC message comprising information for instructing user equipment (UE) to perform activation configuration of packet data convergence protocol (PDCP) duplication.

In step S302, the base station transmits the generated RRC message to the user equipment (UE).

In step S303, the base station generates and transmits a switching MAC CE to the user equipment (UE), and the user equipment is instructed by the switching MAC CE to activate and/or deactivate the RLC entities and/or logical channels associated with the bearer that supports PDCP duplication.

Regarding to the specific setting content of the "switching MAC CE", appropriate settings may be made with reference to the content of the following embodiments.

Figure 4:
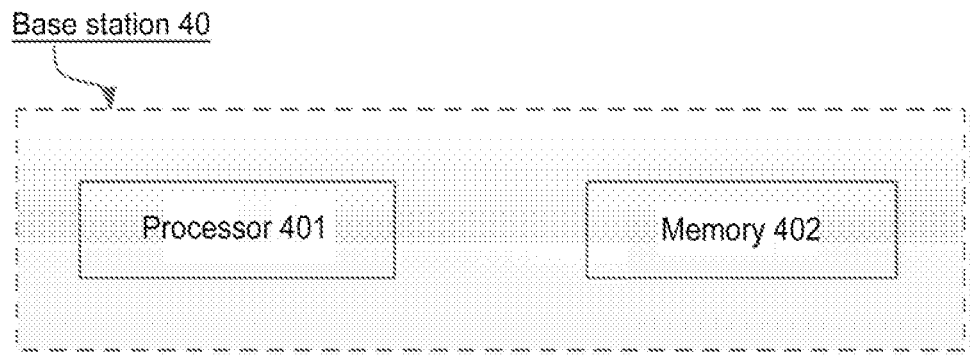
FIG. 4 shows a block diagram of a base station 40 based on an embodiment of the present disclosure.

In addition, FIG. 4 shows a block diagram of a base station 40 according to an embodiment of the present disclosure. As shown in FIG. 4, the base station 40 includes a processor 401 and a memory 402. As mentioned above, the base station 40 in the present disclosure may be any type of base station, including but not limited to: a Node B or an enhanced base station eNB, or may be a base station gNB in a 5G communication system, or a micro base station, a pico base station, a macro base station, a home base station, and the like. The processor 401 may include, for example, a microprocessor, a microcontroller, an embedded processor, and the like. The memory 402 may include, for example, a volatile memory (for example, a random access memory (RAM)), a hard disk drive (HDD), a non-volatile memory (for example, a flash memory), or other memory systems. The memory 402 stores program instructions. The instructions, when run by the processor 401, can execute the method in a base station described in detail in the present disclosure.

Hereinafter, specific examples and embodiments related to the present disclosure are described in detail. In addition, as described above, the examples and embodiments described in the present disclosure are illustrative descriptions for facilitating understanding of the present invention, rather than limiting the present invention.

First, an embodiment in which a base station configures a bearer that supports PDCP duplication for user equipment and sets an initial state of the bearer is described hereinafter.

The user equipment receives an RRC message from the base station (the RRC message in the embodiment of the present disclosure may be an RRC reconfiguration message), and the message comprises an activation indicator (denoted as a first indicator, for example, represented by an information element activatedPath). The activation indicator may be used for indicating an RLC entity(ies) and/or logical channel(s) and/or RLC bearer(s) in an activated state; or, the activation indicator may be used for indicating an RLC entity(ies) and/or logical channel(s) and/or RLC bearer(s) in an activated state when PDCP duplication is activated or deactivated; or, the activation indicator may be used for indicating an RLC entity(ies) and/or logical channel(s) and/or RLC bearer(s) in an activated state in an initial state; or, the activation indicator may be used for indicating whether a corresponding RLC entity(ies) and/or logical channel(s) and/or RLC bearer(s) is/are in an activated state.

Optionally, the RRC message also includes an information element (denoted as maxNrofActivatedLCH) for indicating a maximum number of activatable RLC entities and/or logical channels and/or RLC bearers when PDCP duplication is activated. The value of the information element is an integer and does not exceed a maximum number of RLC entities and/or logical channels and/or RLC bearers that can be configured for one bearer or a maximum value maxLC-ID of a logical channel identity.

Optionally, the RRC message further comprises an information element (denoted as releaseAllowedServingCells) for indicating whether to remove a restriction on a serving cell after deactivation of PDCP duplication (the restriction on the serving cell can be configured by an information element allowedServingCells, and if the information element appears, a UL MAC SDU corresponding to a logical channel can only be mapped to a serving cell in a cell list specified by the information element). In other words, after deactivation of PDCP duplication, the uplink UL MAC SDU from the logical channel can be mapped to any (or all) serving cells configured in the cell group. The information element may be configured in PDCP-config, in which case the information element is applied to all RLC entities or logical channels. The information element may also be configured in LogicalChannelConfig, in which case the information element is only applied to the corresponding logical channel or an RLC entity associated with the logical channel. For example, if the information element has the value of 1 or true or the information element appears, it indicates that the restriction on the serving cell is removed after deactivation of PDCP duplication.

Optionally, in carrier aggregation, if the number of activated RLC entities and/or logical channels and/or RLC bearers indicated by the activation indicator is larger than two, PDCP duplication is activated. The PDCP entity will duplicate a PDCP PDU and transmit the PDCP PDUs to the activated RLC entities and/or logical channels and/or RLC bearers associated therewith. If the number of activated RLC entity and/or logical channel and/or RLC bearer indicated by the activation indicator is only one, PDCP duplication is deactivated. The PDCP entity transmits the PDCP PDU to the activated RLC entity and/or logical channel and/or RLC bearer.

Optionally, the RRC message further comprises a PDCP duplication indicator (denoted as pdcp-Duplication) for indicating whether an uplink duplication status is configured and activated when this information element is received. In carrier aggregation, if the value of the PDCP duplication indicator is true, the PDCP entity duplicates a PDCP PDU and transmits the PDCP PDUs to a plurality of activated RLC entities. If the value of the PDCP duplication indicator is false, the PDCP entity transmits the PDCP PDU to an activated RLC entity (or primary path) or the PDCP entity transmits the PDCP PDU to one activated RLC entity (the RLC entity is an RLC entity among activated RLC entities that is associated with a logical channel having the smallest (or smaller or largest or larger) logical channel identity). If the value of the PDCP duplication indicator is false and there is no primary path configured in the RRC message, only one RLC entity and/or logical channel and/or RLC bearer is activated (that is, the value of the activation indicator thereof is true). In dual connectivity, if the value of pdcp-Duplication is true, the PDCP entity duplicates a PDCP PDU and transmits the PDCP PDUs to a plurality of activated RLC entities and/or logical channels and/or RLC bearers associated therewith. If the value of pdcp-Duplication is false, the PDCP entity transmits the PDCP PDU in a split bearer data transmission manner. Specifically, in this case, the RRC message further comprises a configuration of a primary path and/or a data split threshold (denoted as ul-DataSplitThreshold in the present disclosure). If a total data volume is equal to or larger than the data split threshold, the PDCP entity transmits the PDCP PDU to one of two or more activated RLC entities. If the total data volume is less than the data split threshold, the PDCP entity transmits the PDCP PDU to an RLC entity specified by the primary path. The value of the primary path may be a cell group identity or an MCG or an SCG. In this case, when the total data volume is less than the data split threshold, the PDCP entity transmits the PDCP PDU to an RLC entity and/or logical channel and/or RLC bearer that is activated and belongs to (or is associated with) a cell group indicated by the primary path.

Optionally, in carrier aggregation, for a PDCP control PDU, when PDCP duplication is activated, it may be predefined to transmit the PDCP control PDU to an RLC entity that is activated and associated with a logical channel having the smallest (or smaller or largest or larger) logical channel identity. In other words, in this case, the RLC entity that is activated and associated with the logical channel having the smallest (or smaller or largest or larger) logical channel identity serves as the primary path.

Embodiment 1

The activation indicator may be comprised in PDCP-config for indicating that one or a plurality of RLC entities or logical channels or RLC bearers of a specific cell group is activated. The activation indicator (denoted as ActivatedPath) may include a cell group indicator (for example, represented by an information element cellGroup) and/or a logical channel indicator (for example, represented by an information element logicalHChannelList). The cell group indicator is used for indicating a cell group. A cell group identity (denoted as CellGroupId) of a master cell group (MCG) may be 0, and other values indicate a secondary cell group. The logical channel indicator is used for indicating an activated RLC entity(ies) (or a logical channel(s) associated therewith) and/or logical channel(s) and/or RLC bearer(s), and the value of the logical channel indicator may be a logical channel identity LogicalChannelIdentity (i.e., LCH ID) list or a bitmap. Each bit in the bitmap corresponds to one logical channel. Logical channel identities of logical channels associated with the bearer or a PDCP entity thereof can sequentially correspond to respective bits in the bitmap (from left to right) in decreasing or increasing order. For example, an RLC entity and/or logical channel and/or RLC bearer corresponding to a bit with a value of 0 in the bitmap is deactivated (or activated); and an RLC entity and/or logical channel and/or RLC bearer corresponding to a bit with a value of 1 in the bitmap is activated (or deactivated). In carrier aggregation, the activation indicator may comprise only a logical channel indicator. In dual connectivity, the number of elements in the logical channel identity list or the length of the bitmap may be set to a configurable maximum number of RLC entities or maximum number of logical channels for a bearer that supports PDCP duplication minus 1.

PDCP-Config information element

```
-- ASN1START
-- TAG-PDCP-CONFIG-START
PDCP-Config ::=         SEQUENCE {
    drb                 SEQUENCE {
        discardTimer        ENUMERATED {ms10, ms20, ms30, ms40, ms50, ms60, ms75, ms100, ms150,
ms200,
                                        ms250, ms300, ms500, ms750, ms1500, infinity}
OPTIONAL, -- Cond Setup
        [[omit]]
        moreThanOneRLC      SEQUENCE {
            primaryPath         SEQUENCE {
                cellGroup           CellGroupId                 OPTIONAL,   -- Need R
                logicalChannel      LogicalChannelIdentity      OPTIONAL    -- Need R
            },
            ul-DataSplitThreshold   UL-DataSplitThreshold       OPTIONAL, -- Cond SplitBearer
            pdcp-Duplication        BOOLEAN                     OPTIONAL    -- Need R
            ActivatedPath       SEQUENCE {
                cellGroup           CellGroupId                 OPTIONAL,   -- Need R
                logicalChannelList      LogicalChannelIdentity      OPTIONAL    -- Need R
            },
    }                           OPTIONAL, -- Cond MoreThanOneRLC
[[omit]]
-- TAG-PDCP-CONFIG-STOP
-- ASN1STOP
```

Embodiment 2

The activation indicator may be comprised in PDCP-config. The activation indicator has two information elements. One information element (denoted as MCGActivatedPath) is used for indicating an activated RLC entity(ies) and/or logical channel(s) and/or RLC bearer(s) in a master cell group (MCG). Another information element (denoted as SCGActivatedPath) is used for indicating an activated RLC entity(ies) and/or logical channel(s) and/or RLC bearer(s) in a secondary cell group (SCG). The value of the MCGActivatedPath (or SCGActivatedPath) may be a logical channel identity LogicalChannelIdentity (i.e., LCH ID) list or a bitmap. Each bit in the bitmap corresponds to one logical channel. Logical channel identities of logical channels associated with the bearer or a PDCP entity thereof and located in the MCG (or SCG) can sequentially correspond to respective bits in the bitmap (from left to right) in decreasing or increasing order. For example, an RLC entity and/or logical channel and/or RLC bearer corresponding to a bit with a value of 0 in the bitmap is deactivated (or activated); and an RLC entity and/or logical channel and/or RLC bearer corresponding to a bit with a value of 1 in the bitmap is activated (or deactivated). In dual connectivity, the number of elements in the logical channel identity list or the length of the bitmap may be set to a configurable maximum number of RLC entities or maximum number of logical channels for a bearer that supports PDCP duplication minus 1.

Optionally, the MCGActivatedPath and/or SCGActivatedPath comprises a primary path indication information element for indicating whether a corresponding cell group or an RLC entity (or logical channel) belonging to the corresponding cell group or an activated RLC entity (or logical channel) belonging to the corresponding cell group serves as a primary path. If the primary path indication information element has the value of true or 1 or the primary path indication information element appears, the corresponding cell group or the RLC entity (or logical channel) belonging to the corresponding cell group or the activated RLC entity (or logical channel) belonging to the corresponding cell group serves as the primary path, otherwise, does not serve as the primary path; vice versa.

PDCP-Config information element

```
-- ASN1START
-- TAG-PDCP-CONFIG-START
PDCP-Config ::=         SEQUENCE {
    drb                 SEQUENCE {
        discardTimer        ENUMERATED {ms10, ms20, ms30, ms40, ms50, ms60, ms75, ms100, ms150,
ms200,
                                        ms250, ms300, ms500, ms750, ms1500, infinity}
OPTIONAL, -- Cond Setup
        [[omit]]
        moreThanOneRLC      SEQUENCE {
            primaryPath         SEQUENCE {
                cellGroup           CellGroupId                 OPTIONAL,   -- Need R
                logicalChannel      LogicalChannelIdentity      OPTIONAL    -- Need R
            },
            ul-DataSplitThreshold   UL-DataSplitThreshold       OPTIONAL, -- Cond SplitBearer
            pdcp-Duplication        BOOLEAN                     OPTIONAL    -- Need R
            MCGActivatedPath        LogicalChannelIdentityList -- OPTIONAL
            SCGActivatedPath        LogicalChannelIdentityList -- OPTIONAL
    }                           OPTIONAL, -- Cond MoreThanOneRLC
[omit]
-- TAG-PDCP-CONFIG-STOP
-- ASN1STOP
```

Embodiment 3

The activation indicator (denoted as initialActivated) may be comprised in RLC-BearerConfig for indicating whether a corresponding RLC entity and/or logical channel and/or RLC bearer is in an activated state, or for indicating whether the corresponding RLC entity and/or logical channel and/or RLC bearer is in an activated state when the information element is received.

If the activation indicator initialActivated has the value of true or 1 or the indicator appears, it indicates that the corresponding RLC entity and/or logical channel and/or RLC bearer is in an activated state; and if the value of the activation indicator initialActivated is false or 0 or the indicator does not appear, it indicates that the corresponding RLC entity and/or logical channel and/or RLC bearer is in a deactivated state. Vice versa.

Optionally, the RLC-BearerConfig may further comprise a primary path information element, which has the value of true or false, or 0 or 1, or is determined depending on presence or absence of the primary path information element. If the primary path information element has the value of true or 1 or appears, an RLC entity associated therewith serves as a primary path, otherwise does not serve as the primary path. Vice versa.

Optionally, in an initial state of carrier aggregation, if PDCP duplication is deactivated (for example, pdcp-Duplication does not appear or is set to false), only one RLC entity is in an activated state, that is, the activation indicator initialActivated of only one RLC entity has the value of true or 1 or the indicator appears; if PDCP duplication is activated, at least two RLC entities are in an activated state, that is, the activation indicators InitialActivated of at least two RLC entities have the value of true or 1 or the indicators appear.

| RLC-BearerConfig information element |
|---|
| ```
-- ASN1START
-- TAG-RLC-BEARERCONFIG-START
RLC-BearerConfig : :=                           SEQUENCE {
    logicalChannelIdentity                          LogicalChannelIdentity,
    servedRadioBearer                               CHOICE {
       srb-Identity                                   SRB-Identity,
       drb-Identity                                   DRB-Identity
    }
OPTIONAL, -- Cond LCH-SetupOnly
    reestablishRLC              ENUMERATED {true}       OPTIONAL, -- Need N
    rlc-Config                  RLC-Config              OPTIONAL, -- Cond LCH-Setup
    mac-LogicalChannelConfig    LogicalChannelConfig    OPTIONAL, -- Cond LCH-Setup
    initialActivated            BOOLEAN,
    ...
}
-- TAG-RLC-BEARERCONFIG-STOP
-- ASN1STOP
``` |

Embodiment 4

In carrier aggregation, in an initial state, if PDCP duplication is activated, a PDCP entity transmits a PDCP PDU to RLC entities associated with logical channels having the smallest and second smallest (or largest and second largest) logical channel identities (herein two logical channels are used as an example, and so forth if there are a plurality of logical channels). If PDCP duplication is deactivated, the PDCP entity transmits the PDCP PDU to an RLC entity associated with a logical channel having the smallest (or largest) logical channel identity.

In dual connectivity, in an initial state, if PDCP duplication is activated, the PDCP entity transmits a PDCP PDU to an RLC entity associated with a logical channel having the smallest (or largest) logical channel identity in each cell group. If PDCP duplication is deactivated and a total data volume is greater than or equal to a data split threshold, the PDCP entity transmits the PDCP PDU to one of RLC entities associated with a logical channel having the smallest (or largest) logical channel identity in two cell groups, respectively. If PDCP duplication is deactivated and the total data volume is less than the data split threshold, the PDCP entity transmits the PDCP PDU to a primary path. A cell group to which the primary path belongs may be configured by RRC, and then an RLC entity associated with a logical channel having the smallest (or largest) logical channel identity in the cell group is predefined as the primary path.

Alternatively, the initial state of PDCP duplication is always deactivated. In carrier aggregation, the PDCP entity transmits a PDCP PDU to an RLC entity associated with a logical channel having the smallest (or largest) logical channel identity. In dual connectivity, if the total data volume is greater than or equal to the data split threshold, the PDCP entity transmits a PDCP PDU to one of RLC entities associated with a logical channel having the smallest (or largest) logical channel identity in two cell groups, respectively. If the total data volume is less than the data split threshold, the PDCP entity transmits the PDCP PDU to a primary path. A cell group to which the primary path belongs may be configured by RRC, and then an RLC entity associated with a logical channel having the smallest (or largest) logical channel identity in the cell group is predefined as the primary path.

Embodiment 5

The activation indicator may be comprised in PDCP-config, and the activation indicator comprises two information elements, namely, a primary path indicator (denoted as PrimaryPath) and a secondary path indicator (denoted as SecondaryPath). The primary path indicator may further comprise two indicators, one of which is a cell group identity (i.e., cell group ID) for indicating a cell group of a primary path (or primary RLC entity) and/or a logical channel identity (or logical channel identity list or bitmap) for indicating a logical channel of the primary path. The secondary path indicator identity may also comprise two indicators, one of which is a cell group identity for indicating a cell group of a secondary path and/or a logical channel identity (or logical channel identity list or bitmap) for indicating a logical channel of the secondary path. Each bit in the bitmap corresponds to one logical channel. Logical channel identities of logical channels associated with the bearer or a PDCP entity thereof and located in the cell group indicated by the cell group identity can sequentially correspond to bits in the bitmap (from left to right) in decreasing or increasing order. For example, an RLC entity and/or logical channel and/or RLC bearer corresponding to a bit with a value of 0 in the bitmap is deactivated (or activated); and an RLC entity and/or logical channel and/or RLC bearer corresponding to a bit with a value of 1 in the bitmap is activated (or deactivated). In dual connectivity, the number of elements in the logical channel identity list or the length of the bitmap may be set to a configurable maximum number of RLC entities or maximum number of logical channels for a bearer that supports PDCP duplication minus 1. After deactivation of PDCP duplication, if the primary path comprises a plurality of logical channels or RLC entities or RLC logical channels, a logical channel or RLC entity or RLC logical channel thereamong with the largest or smallest logical channel identity may be predefined as a logical channel or RLC entity or RLC logical channel for transmitting a PDCP PDU (that is, the PDCP entity transmits the PDCP PDU to the logical channel or RLC entity or RLC logical channel), or one of the logical channels or RLC entities or RLC logical channels may be configured by RRC (for example, indicated by an indicator) to transmit the PDCP PDU.

It should be noted that in the present disclosure, corresponding to PDCP duplication based on carrier aggregation, since RLC entities or logical channels associated with the same bearer (or PDCP entity) that supports PDCP duplication belongs to one cell group, the activation indicator in this case may not comprise cell group identity. In other words, the activation indicator only comprises logical channel indication information.

The following describes an embodiment of dynamically switching an RLC entity when PDCP duplication is activated.

Embodiment 6: Switching MAC CE

User equipment (UE) receives an RRC message from a base station. The RRC message configures a plurality of RLC entities and/or logical channels for a bearer that supports PDCP duplication.

The user equipment receives a switching MAC CE from the base station. The switching MAC CE is used to activate and/or deactivate the RLC entities and/or logical channels associated with the bearer that supports PDCP duplication. The switching MAC CE comprises a field (may be denoted as Di) for indicating the bearer that supports PDCP duplication, and a field (may be denoted as Lij) for indicating the RLC entities or logical channels associated with the bearer (or a PDCP entity of the bearer). The switching MAC CE is related to a MAC entity. A switching MAC CE from a specific MAC entity only indicates an RLC entity(ies) (or logical channel(s)) associated with this MAC entity and a DRB or SRB that supports duplication corresponding thereto.

Figure 5:
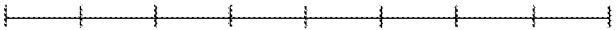
FIG. 5 shows a schematic diagram of a switching MAC CE.

FIG. 5 shows a schematic diagram of the switching MAC CE. In FIG. 5, Di corresponds to DRBi or SRBi, where i is a corresponding serial number in ascending or descending order of DRB identities (or SRB identities) of DRBs (or SRBs) configured with PDCP duplication, and RLC entities (or some of associated RLC entities) associated with the DRBs (or SRBs) are located in this MAC entity. The SRBs can also support dynamic switching of an RLC entity or logical channel for data transmission. If the SRBs support dynamic switching of an RLC entity or logical channel for data transmission, the SRBs and DRBs can use different switching MAC CEs; or the switching MAC CE comprises a field for indicating whether the corresponding switching MAC CE is used for an SRB or a DRB (a MAC CE used for an SRB and a MAC CE used for a DRB when distinguished according to different values of the field), for example, if the value of the field is 0 (or 1), the corresponding switching MAC CE is used for an SRB (or DRB), that is, Di corresponds to an SRB (or DRB), and vice versa; or mapped to Di in a manner of SRB first and then DRB, or DRB first and then SRB. Furthermore, SRBs (or DRBs) may be mapped to Di in the switching MAC CE in order of the bearer identity numbers from smallest to largest or from largest to smallest (mapping may be performed in order from left to right or from right to left; for example, D0 corresponds to a DRB or SRB with the smallest or largest bearer identity).

In FIG. 5, the field Lij is used for indicating activating or deactivating the j-th RLC entity and/or logical channel of the bearer corresponding to Di, where j is a serial number in ascending or descending order of logical channel identities of RLC entities and/or logical channels of the bearer corresponding to Di associated with this MAC entity. If the value of the field is 0, the corresponding RLC entity and/or logical channel is deactivated; if the value of the field is 1, the corresponding RLC entity and/or logical channel is activated. Vice versa.

Preferably, when Di=0, the corresponding field Lij is not comprised in the switching MAC CE. Alternatively, when Di=0, only one field Lij at most has the value of 1. Alternatively, when Di=0, the corresponding field Lij is not comprised in the switching MAC CE, but the switching MAC CE comprises a field for indicating an RLC entity and/or logical channel in an activated state after deactivation of PDCP duplication. The value of the field may be a logical channel identity of the activated logical channel or a logical channel identity of a logical channel associated with the activated RLC entity, or the value of the field is 0 or 1, indicating deactivation of other RLC entities other than an RLC entity associated with a logical channel having the smallest logical channel identity, or the value of the field is 0 or 1, indicating deactivation of other RLC entities other than an RLC entity associated with a logical channel having the largest logical channel identity.

If the switching MAC CE is further used for activating or deactivating PDCP duplication, Di is used for indicating whether PDCP duplication of SRBi or DRBi is in an activated state or a deactivated state. If Di=0, it indicates that the PDCP duplication of SRBi or DRBi is deactivated; if Di=1, it indicates that the PDCP duplication of SRBi or DRBi is activated. Vice versa. Optionally, Di is further used for indicating whether Lij appears in the switching MAC CE. When Di=0, the corresponding field Lij is not comprised in the switching MAC CE; when Di=1, the corresponding field Lij is comprised in the switching MAC CE.

If the switching MAC CE is not used for duplication activation/deactivation, the switching MAC CE may only comprise a logical channel corresponding to an activated bearer (which may be a logical channel only belonging to this MAC entity). In this case, the field Di in FIG. 5 may not be carried, and the switching MAC CE only carries fields Lij corresponding to those activated bearers. The arrangement of the fields Lij is consistent with that shown in FIG. 5, and the fields Lij may be arranged in ascending or descending order according to bearer identity sizes of corresponding Di, and Lij corresponding to each activated bearer may be arranged in ascending or descending order according to logical channel identity sizes.

Alternatively, the switching MAC CE may further instruct only one bearer to switch its associated RLC entity(ies) and/or logical channel(s) at a time. In this case, the switching MAC CE carries a bearer identity and a field(s) Lij (used for indicating an activated logical channel(s) of the corresponding bearer).

After receiving the switching MAC CE, the user equipment performs one of the following operations:
1) If PDCP duplication is deactivated (the field Di is 0), instruct an upper layer to deactivate PDCP duplication of the corresponding bearer.
2) If PDCP duplication is activated (the field Di is 1), which indicates switching of an RLC entity(ies) or a logical channel(s), instruct the upper layer to switch the RLC entity(ies) and/or the logical channel(s); or indicate to the upper layer an activated logical channel identity(ies) or a logical channel identity(ies) of a logical channel(s) associated with an activated RLC entity(ies), or indicate to the upper layer the logical channel identity(ies), or indicate to the upper layer the activated RLC entity(ies). Optionally, the user equipment further instructs the upper layer to activate PDCP duplication of the corresponding bearer.
3) If the RLC entity(ies) is switched, instruct the upper layer (PDCP entity) corresponding to the bearer identity to switch the logical channel(s) (or the RLC entity (ies)), or indicate to the upper layer the logical channel identity(ies) (or the RLC entity(ies) corresponding thereto).

Embodiment 7: RRC Configuration+Switching MAC CE

User equipment receives an RRC message (for example, an RRC reconfiguration message) from a base station, and the message comprises an RLC entity group or logical channel group or RLC bearer group that can be used after activation of PDCP duplication. Specifically, RLC entities and/or logical channels associated with the same bearer are divided into several groups, and a group number can be configured for each group in the RRC message. For example, one group number indicator is used to indicate the group number, and another group indicator is used to indicate RLC entities or logical channels comprised in the group. The group may be represented by using a logical channel identity list or a bitmap. In the case of grouping according to a bitmap, each bit in the bitmap corresponds to each RLC entity and/or logical channel (which can be mapped in increasing or decreasing order) of this bearer, and RLC entities and/or logical channels corresponding to bits of 1 in the bitmap are divided into the same group. Alternatively, RLC entities and/or logical channel groups are numbered according to a sequential order of the RLC entity and/or logical channel groups. The first group number is 0 (or 1), the second group number is 1 (or 2), and so on.

The user receives a switching MAC CE from the base station. The switching MAC CE is used to instruct to switch a PDCP duplication RLC entity or logical channel to an RLC entity or logical channel indicated by the MAC CE. Preferably, a field value of the switching MAC CE is a number of the RLC entity and/or logical channel group. Alternatively, the switching MAC CE is a bitmap. Bits in the bitmap have a one-to-one correspondence in ascending or descending order of group numbers. A bit with a value of 1 in the bitmap indicates that an RLC entity and/or logical channel in the group is activated, and a bit with a value of 0 in the bitmap indicates that an RLC entity and/or logical channel in the group is deactivated. Only one bit in the MAC CE at most can be set to 1. Optionally, if all bits in the bitmap are set to 0, PDCP duplication of corresponding bearers is deactivated.

Embodiments regarding how to determine an RLC entity to which a PDCP entity transmits a PDCP PDU after PDCP duplication is deactivated (carrier aggregation and dual connectivity scenarios are discussed separately) are described below.

Embodiment 8 to Embodiment 10 are used as examples to describe processing in the case of carrier aggregation. In carrier aggregation, RLC entities and/or logical channels and/or RLC bearers associated with the same bearer that supports PDCP duplication or a PDCP entity thereof belong to the same cell group.

Embodiment 8 (after Deactivation of PDCP Duplication, a PDCP Entity Transmits a PDCP PDU to a Primary Path)

In this embodiment, UE receives an RRC message from a base station, and the RRC message carries a primary path indication information element (denoted as primaryPath). The primary path indication information element may include a cell group indication information element cellGroup for indicating a cell group identity and/or a logical channel indication information element logicalChannel) for indicating a logical channel identity. If PDCP duplication is deactivated (for example, a duplication activation/deactivation MAC CE is received), a PDCP entity transmits a PDCP PDU to a primary path. In other words, even if the primary path is deactivated before PDCP duplication is deactivated, when the PDCP duplication is deactivated, the primary path is activated and used by the PDCP entity to transmit the PDCP PDU. For example, when a MAC entity receives a duplication activation/deactivation MAC CE (or switching MAC CE), if the primary path or an RLC entity or logical channel or RLC bearer indicated by the primary path is deactivated, the MAC layer (the MAC layer instructs an upper layer to) activates the primary path or the RLC entity or logical channel or RLC bearer indicated by the primary path, and indicates to the upper layer that PDCP duplication is deactivated; or, the MAC layer indicates to the upper layer that PDCP duplication is deactivated, and the upper layer activates the primary path or the RLC entity or logical channel or RLC bearer indicated by the primary path; or, when the MAC entity receives the duplication activation/deactivation MAC CE (or switching MAC CE), the MAC entity instructs the upper layer to deactivate PDCP duplication and/or the RLC entity defined by the primary path or the RLC entity corresponding to the logical channel identity or the logical channel or the logical channel identity.

Embodiment 9 (after Deactivation of PDCP Duplication, a PDCP Entity Transmits a PDCP PDU to an Activated RLC Entity Specified by a Switching MAC CE)

In this embodiment, UE receives a switching MAC CE from a base station. For example, the switching MAC CE indicates that the value of Di corresponding to a bearer DRB i (or SRB i) is 0, that is, PDCP duplication is deactivated.

Preferably, a MAC entity activates an RLC entity and/or logical channel and/or RLC bearer corresponding to Lij with a value of 1 corresponding to the bearer DRB i (or SRB i), and instructs an upper layer to deactivate PDCP duplication of the corresponding bearer; or, at the same time, indicates to the upper layer the activated RLC entity(ies) and/or logical channel(s) and/or RLC bearer(s) and/or logical channel identity(ies); or, instructs the upper layer to activate PDCP duplication and/or indicates the upper layer the activated RLC entity(ies). In this case, corresponding to Di with a value of 0, there is only one corresponding Lij with a value of 1.

Alternatively, when Di=0, the corresponding field Lij is not comprised in the switching MAC CE, but the switching MAC CE comprises a field for indicating an RLC entity and/or logical channel in an activated state after deactivation of PDCP duplication. The value of the field is an identity of the activated logical channel or a logical channel identity of a logical channel associated with the activated RLC entity.

Embodiment 10 (after Deactivation of PDCP Duplication, a PDCP Entity Transmits a PDCP PDU to a Logical Channel with a Smaller (or Larger or Smallest or Largest) Logical Channel Identity Associated with an Activated RLC Entity when a MAC CE of Activating/Deactivating PDCP Duplication is Received)

In this embodiment, when a MAC CE (for example, a duplication activation/deactivation MAC CE or a switching MAC CE) for deactivating PDCP duplication is received, if PDCP duplication of a specific bearer is deactivated, a MAC entity performs at least one of the following operations when the MAC CE is received:

A. Deactivate (or instruct an upper layer to deactivate) an RLC entity and/or RLC bearer associated with a logical channel having a larger (or smaller) logical channel identity, or deactivate a logical channel having a larger (or smaller) logical channel identity.

B. Deactivate (or instruct the upper layer to deactivate) an RLC entity(ies) and/or logical channel(s) and/or RLC bearer(s) corresponding to the bearer (or associated with a PDCP entity of the bearer), except for that having the largest (or smallest) logical channel identity, or except for an RLC entity and/or RLC bearer associated with the largest (or smallest) logical channel identity thereamong, or except for a logical channel with the largest (or smallest) logical channel identity. The largest or smallest is only in consideration of the largest or smallest one of the logical channel identities corresponding to activated logical channels (or RLC entities).

C. Instruct the upper layer to deactivate PDCP duplication.

D. Instruct the upper layer to activate a logical channel having the largest (or smallest) logical channel identity thereamong, or instruct the upper layer to activate an RLC entity or RLC bearer associated with the largest (or smallest) logical channel identity thereamong. The largest or smallest is only in consideration of the largest or smallest one of the logical channel identities corresponding to activated logical channels (or RLC entities).

In this embodiment, after it is predefined to deactivate PDCP duplication of the bearer, the PDCP entity transmits a PDCP PDU to the RLC entity associated with the logical channel having the smallest (or largest) logical channel identity. The largest or smallest is only in consideration of the largest or smallest one of the logical channel identities corresponding to activated logical channels (or RLC entities). In this embodiment of the present disclosure, activating an RLC entity means that the PDCP entity transmits a PDCP PDU to the RLC entity. Deactivating an RLC entity means that the PDCP entity no longer transmits a PDCP PDU to the RLC entity.

Next, Embodiment 11 to Embodiment 13 are used as examples to describe the processing in the case of dual connectivity.

In dual connectivity, RLC entities and/or logical channels and/or RLC bearers associated with the same bearer that supports PDCP duplication or a PDCP entity thereof belong to different cell groups. For a bearer configured with PDCP duplication (for example, a base station configures PDCP duplication for user equipment by an RRC message), if PDCP duplication is in an activated state, a PDCP entity will duplicate a PDCP PDU and transmit the PDCP PDUs to the RLC entities that are associated with the PDCP entity and activated; if PDCP duplication is in a deactivated state and activated RLC entities belong to different cell groups and a total data volume is equal to or greater than a data split threshold configured in the RRC message (for example, indicated by an information element ulDataSplitThreshold), the data (i.e., the PDCP PDU) is transmitted to a primary path (in the present disclosure, the primary path may also be referred to as a primary RLC entity) or a secondary RLC entity (or an activated secondary RLC entity); if PDCP duplication is in a deactivated state and the activated RLC entities belong to different cell groups and if the total data volume is less than the data split threshold configured in the RRC message (for example, indicated by the information element ulDataSplitThreshold), the data (i.e., the PDCP PDU) is transmitted to the primary path. This data transmission manner in which the total data volume is compared with the data split threshold, and the PDCP entity only transmits the PDCP PDU to the primary path if the total data volume is less than the data split threshold, and the PDCP entity transmits the PDCP PDU to one of the primary path and other activated RLC entities if the total data volume is greater than or equal to the data split threshold is called data splitting. The primary path can be defined in the manner described in other embodiments of the present disclosure.

Embodiment 11 (after Deactivation of PDCP Duplication, a PDCP Entity Transmits a PDCP PDU to an RLC Entity Used in an Initial State)

In this embodiment, UE receives an RRC message from a base station, and the RRC message comprises a configuration of a bearer that supports PDCP duplication. Specifically, the RRC message comprises a configuration of a primary path, the configuration of the primary path may include a cell group indicator (or include a cell group indicator and a logical channel indicator), and the cell group indicator is used for indicating which cell group where an RLC entity and/or logical channel can serve as the primary path. If the primary path configuration includes both a cell group indicator and a logical channel indicator, only an RLC entity that is located in a cell indicated by the cell group indicator and is associated with a logical channel indicated by the logical channel indicator (or a logical channel whose logical channel identity is of the value of the logical channel indicator) can serve as the primary path.

When the UE receives from the base station a MAC CE for deactivating PDCP duplication of a specific bearer (for example, a duplication activation/deactivation MAC CE or a switching MAC CE), the UE performs one of the following operations:
  A. The MAC entity instructs an upper layer to deactivate PDCP duplication. After receiving the instruction to deactivate PDCP duplication, the PDCP entity employs a data splitting method by using the activated RLC entity(ies) and the primary path in the RRC message to transmit data.
  B. The MAC entity activates the activated RLC entity(ies) and/or logical channel(s) in the RRC message and instructs the upper layer to deactivate PDCP duplication.
  C. The MAC entity indicates to the upper layer the activated RLC entity(ies) and/or logical channel(s) or logical channel identity(ies) in the RRC message, and optionally, further instructs the upper layer to deactivate PDCP duplication.

Embodiment 12 (After Deactivation of PDCP Duplication, a PDCP Entity Transmits a PDCP PDU to an Activated RLC Entity(ies) Specified by a Switching MAC CE)

In this embodiment, a MAC CE for deactivating PDCP duplication of a bearer carries logical channel identity indication information, which is used to instruct a PDCP entity, after PDCP duplication is deactivated, to transmit a PDCP PDU to an RLC entity associated with a logical channel indicated by the logical channel identity indication information. For example, when the UE receives from the base station a MAC CE for deactivating PDCP duplication of a specific bearer (for example, a duplication activation/deactivation MAC CE or a switching MAC CE), and the value of Di corresponding to the bearer is 0 in the MAC CE, a MAC entity activates an RLC entity corresponding to Lij with a value of 1 or an RLC entity and/or logical channel associated with a logical channel indicated by a logical channel identity indicator, and/or instructs an upper layer to deactivate PDCP duplication and/or indicates to the upper layer the logical channel identity corresponding to Lij with the value of 1 (or the logical channel or the RLC entity associated with the logical channel having the logical channel identity).

Embodiment 13 (after Deactivation of PDCP Duplication, a PDCP Entity Transmits a PDCP PDU to an Activated RLC Entity)

In this embodiment, when a MAC CE for deactivating PDCP duplication (for example, a duplication activation/deactivation MAC CE or a switching MAC CE) is received, if there are only two RLC entities in an activated state, a PDCP entity transmits, according to a manner of data splitting, a PDCP PDU to the RLC entity in an activated state (i.e., the RLC entity in an activated state when the MAC CE of deactivating PDCP duplication is received); if there are more than two RLC entities in an activated state in a specific cell group, it is predefined that the PDCP entity transmits the PDCP PDU according to a manner of data splitting by using a logical channel in the cell group that has the smallest (or largest) logical channel identity or an RLC entity associated with the logical channel having the smallest (or largest) logical channel identity. The largest or smallest is only in consideration of the largest or smallest one of the logical channel identities corresponding to activated logical channels (or RLC entities).

Specifically, when the UE receives from the base station a MAC CE for deactivating PDCP duplication of a specific bearer, a MAC entity performs at least one of the following operations:
  A. For a plurality of activated RLC entities belonging to the same cell group, the MAC entity deactivates (or instructs an upper layer to deactivate) an RLC entity and/or RLC bearer associated with a logical channel having a larger (or smaller or the largest or smallest) logical channel identity, or deactivates the logical channel having the larger (or smaller or largest or smallest) logical channel identity.
  B. For a plurality of activated RLC entities belonging to the same cell group, the MAC entity deactivates (or instructs the upper layer to deactivate) an RLC entity and/or logical channel and/or RLC bearer corresponding to the bearer (or associated with a PDCP entity of the bearer), except for that having the largest (or smallest or larger or smaller) logical channel identity, or except for an RLC entity and/or RLC bearer associated with the largest (or smallest or larger or smaller) logical channel identity thereamong.
  C. Instruct the upper layer to deactivate PDCP duplication.
  D. For a plurality of activated RLC entities belonging to the same cell group, the MAC entity instructs the upper layer to activate a logical channel with the largest (or smallest or larger or smaller) logical channel identity thereamong, or instructs the upper layer to activate an RLC entity or RLC bearer associated with the largest (or smallest or larger or smaller) logical channel identity thereamong.

The larger or smaller or largest or smallest in this embodiment is only in consideration of the larger or smaller or largest or smallest one of the logical channel identities corresponding to activated logical channels (or RLC entities).

In the embodiments of the present disclosure, the RLC entity and/or logical channel and/or RLC bearer in an activated state may also be referred to as an RLC entity and/or logical channel and/or RLC bearer that is activated or used to transmit data. If PDCP duplication is activated, an uplink UL MAC SDU from an activated RLC entity or logical channel can only be transmitted on a serving cell configured therefor. The RLC entity and/or logical channel and/or RLC bearer in an activated state may be an RLC entity and/or logical channel and/or RLC bearer that is used to transmit a PDCP PDU after PDCP duplication is activated or deactivated. The activated RLC entity and/or logical channel and/or RLC bearer refers to an RLC entity indicated in an RRC message (or an RLC entity in an activated state indicated in the RRC message) or an RLC entity indicated by a lower layer (or an RLC entity in an activated state indicated by the lower layer). In carrier aggregation, for a specific bearer, the primary path described in the present disclosure refers to an RLC entity to which the PDCP entity transmits a PDCP PDU (or an RLC entity used to transmit a PDCP PDU) after PDCP duplication is deactivated. In dual connectivity, for a specific bearer, the primary path described in the present disclosure refers to an RLC entity to which the PDCP entity transmits data (or an entity used to transmit a PDCP PDU) when the sum of a PDCP data volume and an RLC data volume to be initially transmitted of an associated (or associated and activated) RLC is less than a data split threshold configured in an RRC message. The indicated upper-layer RLC entity in the embodiments of the present disclosure may also be expressed as an indicated upper-layer logical channel or logical channel identity. In the present disclosure, the activated RLC entity refers to an entity used to transmit a PDCP PDU. After an RLC entity is activated, a PDCP entity can transmit a PDCP PDU to the RLC entity. The deactivated RLC entity described in the present disclosure can also be replaced with a deactivated logical channel.

UE Capability Report

UE receives a capability query message from a base station. The UE transmits a capability report message to the base station. The capability report message carries an information element used for indicating a maximum number of supportable RLC entities and/or logical channels; or the information element is used for indicating a maximum number of RLC entities and/or logical channels that can be simultaneously activated; or the information element is used for indicating how many RLC entities at most to which the PDCP entity can transmit the duplicated PDCP PDUs.

Discard of Duplicated PDUs

For a PDCP entity configured with PDCP duplication, a PDCP transmitting entity performs the following operations:

If an associated RLC entity is switched (or an instruction from a lower layer to switch an RLC entity is received or a switching instruction from the lower layer is received), instruct a deactivated RLC entity to discard all duplicated PDCP data PDUs.

The deactivated RLC entity or logical channel or RLC bearer in the present disclosure means that the PDCP entity no longer transmits PDCP PDUs to the deactivated RLC entity.

The computer-executable instructions or program running on the device according to the present invention may be a program that enables the computer to implement the functions of the embodiments of the present invention by controlling the central processing unit (CPU). The program or information processed by the program may be temporarily stored in a volatile memory (for example, a random access memory (RAM)), a hard disk drive (HDD), a non-volatile memory (for example, a flash memory), or other memory systems.

The computer-executable instructions or program for implementing the functions of the embodiments of the present invention may be recorded on a computer-readable storage medium. The corresponding functions may be achieved by reading programs recorded on the recording medium and executing them by the computer system. The phrase "computer system" herein may be a computer system embedded in the device, which may include operating systems or hardware (e.g., peripherals). The "computer-readable storage medium" may be a semiconductor recording medium, an optical recording medium, a magnetic recording medium, a short-time dynamic memory program recording medium, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulting from appropriate combination of the technical means disclosed in the different embodiments are also included within the technical scope of the present invention. In addition, components with the same effect described in the above embodiments may be replaced with one another.

The invention claimed is:

1. A user equipment comprising:
a processor; and
a memory in electronic communication with the processor,
instructions stored in the memory being executable by the processor to receive a Medium Access Control (MAC)

Control Element (CE) carrying an identity of a data radio bearer (DRB), the MAC CE further carrying a plurality of fields for respective radio link control (RLC) entities associated with the DRB, each of the plurality of fields indicating whether a corresponding one of the RLC entities is activated or deactivated for packet data convergence protocol (PDCP) duplication, the plurality of fields being arranged in ascending or descending order of logical channel identities of the RLC entities, the instructions stored in the memory further being executable by the processor to determine, based on the MAC CE, that one or more of the RLC entities associated with the DRB are deactivated for the PDCP duplication, and the instructions further being executable by the processor to indicate to the one or more of the RLC entities deactivated for the PDCP duplication to discard all duplicated PDCP data protocol data units (PDUs).

2. A base station comprising:

a processor; and a memory in electronic communication with the processor, instructions stored in the memory being executable by the processor to generate a Medium Access Control (MAC) Control Element (CE) based on which one or more radio link control (RLC) entities associated with a data radio bearer (DRB) are determined as being deactivated for packet data convergence protocol (PDCP) duplication, the MAC CE carrying an identity of the DRB, the MAC CE further carrying a plurality of fields for respective RLC entities associated with the DRB, each of the plurality of fields indicating whether a corresponding one of the RLC entities is activated or deactivated for the PDCP duplication, the plurality of fields being arranged in ascending or descending order of logical channel identities of the RLC entities, the instructions further being executable by the processor to transmit the MAC CE to a user equipment, and the MAC CE causing the user equipment to indicate to the one or more RLC entities deactivated for the PDCP duplication to discard all duplicated PDCP data protocol data units (PDUs).

3. A method performed by a user equipment, the method comprising:

receiving a Medium Access Control (MAC) Control Element (CE) carrying an identity of a data radio bearer (DRB), the MAC CE further carrying a plurality of fields for respective radio link control (RLC) entities associated with the DRB, each of the plurality of fields indicating whether a corresponding one of the RLC entities is activated or deactivated for packet data convergence protocol (PDCP) duplication, the plurality of fields being arranged in ascending or descending order of logical channel identities of the RLC entities, determining, based on the MAC CE, that one or more of the RLC entities associated with the DRB are deactivated for the PDCP duplication; and indicating to the one or more of the RLC entities deactivated for the PDCP duplication to discard all duplicated PDCP data protocol data units (PDUs).

4. A method performed by a base station comprising:

generating a Medium Access Control (MAC) Control Element (CE) based on which one or more radio link control (RLC) entities associated with a data radio bearer (DRB) are determined as being deactivated for packet data convergence protocol (PDCP) duplication, the MAC CE carrying an identity of the DRB, the MAC CE further carrying a plurality of fields for respective RLC entities associated with the DRB, each of the plurality of fields indicating whether a corresponding one of the RLC entities is activated or deactivated for the PDCP duplication, the plurality of fields being arranged in ascending or descending order of logical channel identities of the RLC entities; and transmitting the MAC CE to a user equipment, the MAC CE causing the user equipment to indicate to the one or more RLC entities deactivated for the PDCP duplication to discard all duplicated PDCP data protocol data units (PDUs).

\* \* \* \* \*